United States Patent
Bayer et al.

(10) Patent No.: US 9,785,707 B2
(45) Date of Patent: *Oct. 10, 2017

(54) METHOD AND SYSTEM FOR CONVERTING AUDIO TEXT FILES ORIGINATING FROM AUDIO FILES TO SEARCHABLE TEXT AND FOR PROCESSING THE SEARCHABLE TEXT

(71) Applicant: Syscom Inc., Baltimore, MD (US)

(72) Inventors: Theodore F. Bayer, Annapolis, MD (US); Donald R. Adkins, Pasadena, MD (US); Gregory A. Corbin, Baltimore, MD (US)

(73) Assignee: SYSCOM, Inc., Baltimore, MD (US)

( * ) Notice: Subject to any disclaimer, the term of this patent is extended or adjusted under 35 U.S.C. 154(b) by 254 days.

This patent is subject to a terminal disclaimer.

(21) Appl. No.: 14/069,942

(22) Filed: Nov. 1, 2013

(65) Prior Publication Data

US 2014/0059076 A1 Feb. 27, 2014

Related U.S. Application Data

(63) Continuation of application No. 13/651,541, filed on Oct. 15, 2012, which is a continuation-in-part of (Continued)

(51) Int. Cl.
*G06F 17/28* (2006.01)
*G06F 17/30* (2006.01)

(52) U.S. Cl.
CPC .. *G06F 17/30755* (2013.01); *G06F 17/30746* (2013.01)

(58) Field of Classification Search
CPC .... G06F 17/27; G06F 17/271; G06F 17/2735; G06F 17/30796; G06F 17/30787;
(Continued)

(56) References Cited

U.S. PATENT DOCUMENTS 6,076,059 A * 6/2000 Glickman et al. ............ 704/260
6,125,362 A 9/2000 Elworthy
(Continued)

OTHER PUBLICATIONS

P Sibun and A. L. Spitz, "Language Determination: Natural Language Processing from Scanned Document Images." Proceedings of the 4thConference on Applied Natural Language Processing, Stuttgart Germany , pp. 15-21, 1994.
(Continued)

*Primary Examiner* — Abdelali Serrou
(74) *Attorney, Agent, or Firm* — Harness, Dickey & Pierce, PLC

(57) ABSTRACT

A system and method for processing audio text files includes a content repository storing audio text files. A text transformer linguistically analyzes the audio text files within a content of multiple lexicons to form edited text results and creates a reflection repository having reflection files therein corresponding to the audio text files from the edited text results. A search engine searches the reflection files and a user device displays a first reflection file from the reflection files or a first audio text file from the audio files in response to searching.

22 Claims, 7 Drawing Sheets

Related U.S. Application Data application No. 11/871,349, filed on Oct. 12, 2007, now Pat. No. 8,290,270.

(60) Provisional application No. 60/851,799, filed on Oct. 13, 2006.

(58) Field of Classification Search
CPC ......... G06F 17/30864; G06F 17/30746; G06F 17/3074; G06F 17/3089; G06F 17/30893; G06F 17/30896; G06F 17/30902; G06F 17/30755; G06F 17/30253; G06F 3/16; G06F 17/00; G06F 17/2715; G06F 17/30017; G06F 17/3056; G06F 17/30672; G06F 17/30743; G06F 17/30775; G06F 17/30905; G06F 17/30979; G06F 17/30997; G06F 21/32; G10L 15/265; G10L 15/26; G10L 15/22; G10L 15/10; G10L 2015/228; G10L 17/00; G06K 9/6292; G06K 9/72; G06K 9/726
USPC ....... 704/231–245, 251, 256, 260, 270, 275, 704/E15.043, E15.045, 270.1
See application file for complete search history.

(56) References Cited

U.S. PATENT DOCUMENTS

| | | | |
|---|---|---|---|
| 6,490,558 B1* | 12/2002 | Kahn et al. | 704/235 |
| 6,507,643 B1* | 1/2003 | Groner | 379/88.14 |
| 6,608,930 B1 | 8/2003 | Agnihotri et al. | |
| 6,687,671 B2* | 2/2004 | Gudorf et al. | 704/235 |
| 6,735,565 B2* | 5/2004 | Gschwendtner | 704/254 |
| 6,937,766 B1 | 8/2005 | Wilf et al. | |
| 7,236,932 B1* | 6/2007 | Grajski | 704/277 |
| 7,305,228 B2* | 12/2007 | Bartosik | 455/406 |
| 7,376,560 B2* | 5/2008 | Bartosik et al. | 704/235 |
| 7,469,063 B2 | 12/2008 | Koyama et al. | |
| 7,596,370 B2* | 9/2009 | Chengalvarayan et al. | 455/418 |
| 7,904,411 B2* | 3/2011 | Bechtel | G06F 17/30731 704/9 |
| 8,239,197 B2* | 8/2012 | Webb et al. | 704/235 |
| 8,239,480 B2* | 8/2012 | Kokes et al. | 709/217 |
| 8,265,930 B1* | 9/2012 | Jones et al. | 704/235 |
| 8,290,270 B2 | 10/2012 | Bayer et al. | |
| 2002/0133339 A1* | 9/2002 | Gudorf et al. | 704/235 |
| 2002/0138265 A1* | 9/2002 | Stevens et al. | 704/251 |
| 2005/0004690 A1* | 1/2005 | Zhang et al. | 700/94 |
| 2005/0108001 A1* | 5/2005 | Aarskog | G06F 17/271 704/10 |
| 2006/0135215 A1* | 6/2006 | Chengalvarayan et al. | 455/569.2 |
| 2007/0061335 A1* | 3/2007 | Ramer | G06F 17/3064 |
| 2007/0072578 A1 | 3/2007 | Lee et al. | |
| 2007/0081428 A1* | 4/2007 | Malhotra et al. | 369/25.01 |
| 2007/0174326 A1* | 7/2007 | Schwartz et al. | 707/102 |
| 2007/0244702 A1* | 10/2007 | Kahn et al. | 704/260 |
| 2008/0002893 A1 | 1/2008 | Vincent et al. | |
| 2008/0002914 A1 | 1/2008 | Vincent et al. | |
| 2008/0002916 A1 | 1/2008 | Vincent et al. | |
| 2008/0033725 A1* | 2/2008 | Peak et al. | 704/260 |
| 2009/0006369 A1* | 1/2009 | Guday et al. | 707/5 |
| 2010/0017438 A1* | 1/2010 | Haartsen et al. | 707/104.1 |
| 2010/0241963 A1* | 9/2010 | Kulis et al. | 715/727 |
| 2011/0072350 A1* | 3/2011 | Bachtiger | 715/727 |
| 2012/0203776 A1* | 8/2012 | Nissan | 707/728 |
| 2012/0310642 A1* | 12/2012 | Cao et al. | 704/235 |

OTHER PUBLICATIONS (Tong & Evans 1996) Tong, X and Evans, D. A., A Statistical Approach to Automatic OCR Error Correction in Context. In: Proceedings of the fourth Workshop on Very LargeCorpora, 88-100, Copenhagen, Denmark, 1996.

Sato T. et al: "Video OCR for digital news archive" Content-Based Access of Image and Video Database, 1998. Proceedings., 1998 IEEE International Workshop on Bombay, India Jan. 3, 1998, Los Alamitos, CA USA, IEEE Comput. Soc, US, 1998, pp. 52-60,XP010261519.

Hadhoud, M. M. et al: "New trends high resolution image processing" Photonics and its Application, 2004. The fourth workshop on Giza, Egypt May 4, 2004, Piscataway, NJ, USA, IEEE, 2004, pp. 1-23, XP010737924.

KMWorld Names WebQL 3.0 in "Trend-Setting Products of 2006," www.ql2.com/news/press_releases_kmwtsp06_082506.php.

QL2 Software Unveils WebQL 3.0, Computing News Press Service © 2006 Computing News :: home page.

Business Intelligence Lowdown, "Image Text Search Tool," Mar. 7, 2006, www. businessintelligencelowdown.com/2006/03/image_text_sear.html.

Chellapilla, K., et al., "Combining Multiple Classifiers for Faster Optical Character Recognition", Microsoft Research, Feb. 2006, 10 pages.

Levin et al., "Dynamic Planar Warping for Optical Character Recognition", IEEE International Conference on Acoustics, Speech and Signal Processing, vol. 3, Mar. 23-26, 1992, pp. III-149-III-152.

* cited by examiner

METHOD AND SYSTEM FOR CONVERTING AUDIO TEXT FILES ORIGINATING FROM AUDIO FILES TO SEARCHABLE TEXT AND FOR PROCESSING THE SEARCHABLE TEXT

CROSS-REFERENCE TO RELATED APPLICATIONS

This application is a continuation of U.S. patent application Ser. No. 13/651,541 which is a continuation-in-part of U.S. Pat. No. 8,290,270, issued Oct. 16, 2012, which claims priority to U.S. Provisional Application No. 60/851,799, filed on Oct. 13, 2006. The entire disclosures of each of the above applications are incorporated herein by reference.

FIELD

The present disclosure relates generally to searching documents and, more specifically, to searching for information within an audio file.

BACKGROUND

The statements in this section merely provide background information related to the present disclosure and may not constitute prior art.

Searching text documents using a search engine is well known. Searching takes place using the text within the document to identify relevant search results.

Often times, businesses receive a large quantity of non-text-based material. The non-text material may be referred to as image text documents if the image contains a number of words. Image text documents are images of words but the words are not searchable using a search engine. The text appears as a picture or image only and, thus, cannot be searched. The image text files may originate from various sources including faxes, forms, charts, diagrams, pictures, and the like. Often times, metadata may be stored with the image to help identify the image. The metadata may contain various titles, key people, or the like. The metadata may be manually entered for each document.

Audio files are another way in which a business may receive or store material. Audio files may be generated in various ways from voicemails and audio tracks of videos. Typically, businesses have no way to search audio files or the content therein.

When searching image text documents, only the metadata itself is searched. The search results may have limited accuracy due to the limited nature of the metadata. Thus, the documents found in the search may be limited because there is not enough identifying information in the metadata. Consequently, desirable information may be overlooked. Therefore, it is desirable to improve the results of search engines when faced with image text documents.

SUMMARY

The present disclosure is particularly suitable for various types of enterprises that have a large number of documents. The disclosure allows improved search results by converting audio text files to text documents and searching using the text documents.

In one aspect of the disclosure, a method includes processing audio text files generated from audio files comprising linguistically analyzing the audio text files within a context of multiple lexicons to form edited text results, creating reflection files corresponding to the audio text files from the edited text results, storing the reflection files in a reflection repository, processing the reflection files, and displaying a first reflection file from the reflection files or a first audio text file from the audio text files in response to processing.

In a further aspect of the disclosure, a system for searching audio text files includes a content repository storing audio text files. A text transformer linguistically analyzes the audio text files within a context of multiple lexicons to form edited text results and creates a reflection repository having reflection files therein corresponding to the audio text files from the edited text results. A processing tool processes the reflection files and a user device displays a first reflection file from the reflection files or a first audio text file from the audio files in response to processing.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
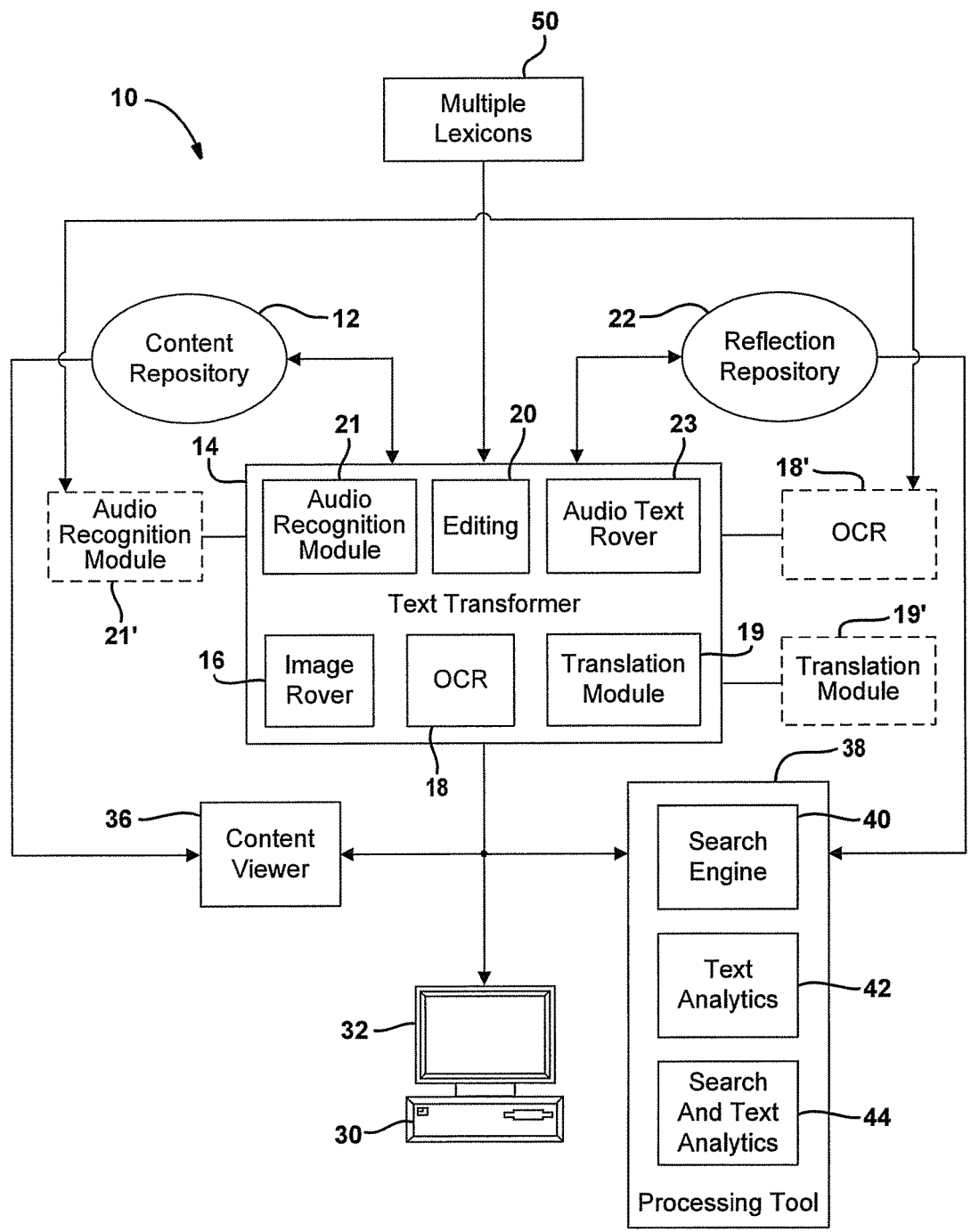
FIG. 1 is a block diagrammatic view of a system according to the present disclosure.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

Referring now to FIG. 1, a document searching system 10 is illustrated having a content repository 12. The content repository 12 is a storage device that includes image text files from various sources. Image text refers to text stored in various image formats. For example, the images may be bit-mapped or formatted in other types of formats. The image text files may originate from various sources including faxes, forms, charts, diagrams, pictures, videos (frames) and the like. Such originations may be associated with various formats.

An image text transformer 14 is in communication with the content repository 12. The image text transformer 14 includes a rover 16 for extracting and collecting images from the content repository 12. One suitable example of a rover is Syscom's Meta Image Rover.

The text transformer 14 may include an optical character recognition (OCR) module 18. An optional position for the OCR module 18 is illustrated outside the image text transformer 14. That is, some optical character results may be pre-generated or communicated to the image text transformer 14. From here on, reference numeral 18 will be used to refer to the OCR module regardless of position. Optical character recognition module 18 forms optical character recognition results and creates reflection files in response to the results. A translation module 19 may also be included within the text transformer 14 or outside the text transformer 14 as translation module 19'. The translation module 19, 19' may process the optical character recognition results and change the optical character recognition results from a first language to a second language. This may take place before further editing or spell-checking. Of course, translation may take place after editing, spell-checking and the like. However, the steps of editing, spell-checking, grammar-checking and the like may take place in a different language and then translated to English, in this example.

The optical character recognition results may be edited or changed in the editing module 20. As will be described below, the editing module 20 may include various types of editing, including linguistically analyzing the optical character recognition results, spell checking the optical character recognition results, and grammar checking the optical character recognition results. Various types of editing or no editing of the optical character recognition results may take place depending on the particular system.

The optical character recognition module may perform OCR on images in the content repository 12. Also, the OCR may be reused from another application such as facsimile recognition. One example is, when facsimile recognition performs OCR, only certain recognized fields are retained to form an index. The remaining OCR results are discarded. The present disclosure may use the OCR results to form or add to the reflection repository 22.

The present disclosure may also be applicable to audio text files that originate from audio files. An audio recognition module 21 and 21' are illustrated within the text transformer 14 and outside of the image text transformer 14. The audio recognition module 21, 21' is used to convert an audio file to an audio text file. This may be performed using various languages with translation to the processing language by the translation module 19. An audio text file originates from an audio file such as an analog or digital audio file. Various sources such as digital recorders, tape records, videos and the like may originate audio files. The audio recognition module 21, 21' converts the audio file to an audio text file using voice recognition.

The text transformer 14 may also include an audio text rover 23. The audio text rover 23 may be used for extracting the audio text files from the content repository 12. The audio text rover 23 provides the audio text files to the text transformer 14 from the content repository 12 for further processing as described below.

The text transformer 14 generates reflection files that are stored in the reflection repository 22. The reflector files may correspond to audio text files or image text documents. The reflection repository 22 may be a separate memory storage device than the content repository 12. The reflection repository 22 may be combined with the content repository 12 in terms of physical location. Also, the reflected documents may also be stored together with their respective document in the content repository. That is, a reflected document and the image text document or audio text file may be linked. The documents and files may be linked so that the same security for the image or audio text files is provided to the reflected documents. The image text documents or audio text files may be stored in the reflection repository 22 with a unique file extension in a form that is compatible for crawling and indexing by various search engines. A suitable search engine is Omnifind's® crawler/indexer or Google®.

The reflection document may be in various formats. For example, the reflection document may be in a rich text format (.rtf), a .pdf format or a .txt format. In a .txt format, the formatting may be removed. This may allow the reflection document to occupy less memory space.

A user device 30, having a display 32, may also be coupled to the text transformer 14. The user device 30 may be a networked computer. The user device 30 may be used to modify batches and control the functioning of the text transformer 14.

The user device 30 may also contain a content viewer 36, a processing tool 38, and search engine 40. The content viewer 36 and the processing tool 38 may be incorporated within the user device 30 as software. The processing tool may include a search engine 40, a text analytics module 42 and/or a search and text analytics module 44. The search engine 40 may be various types of search engines that are used to crawl, parse and index the reflected documents stored in the reflection repository 22. The search engine 40 searches the various reflected documents and returns search results. The text analytics module 42 may be used to analyze the text data. For example, text analytics may compile a quantity of various types of information, including proximity to other words, the number of occurrences within a text and other statistical relationships. The text analytics module 42 may perform linguistic analysis as well as indexing. It should be noted that text analysis typically performs a type of searching. However, the searching mentioned above may be performed in addition to the searching of text analysis. This is set forth in the search and text analytics module 44. The search and text analytics module 44 may provide searching in a crawl-type environment as well as searching in a text analytics environment. Both searching and text analytics may be returned from the processing tool 38.

The content viewer 36 allows the user to generate various views based upon the search results from the processing tool 38. The content viewer 36 may, for example, allow the user 32 to display the reflected document from the reflection repository 22 or the image or audio text files from the content repository 12. Further, the content viewer 36 may allow both the reflected document and the image text document to be viewed side by side. This will be further described in FIG. 7.

Multiple lexicons 50 may be used in the editing module 20. The lexicon 50 may be derived from various sources including common words, proper names, client-specific lexicons (custom), application specific lexicons and industry-specific lexicons.

Figure 2A:
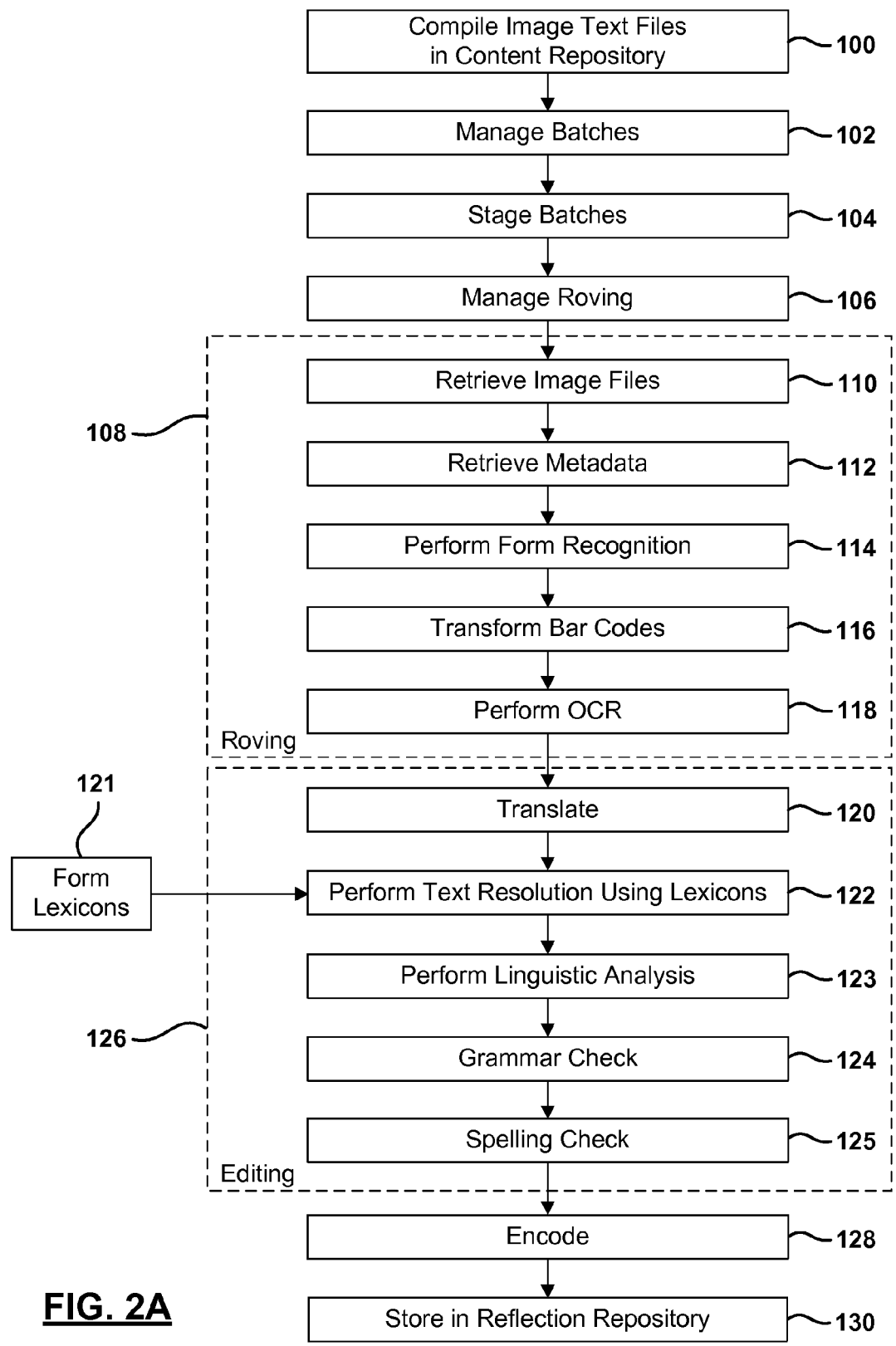
FIG. 2A is a flowchart illustrating a method of converting image text documents to text documents according to the present disclosure.

Referring now to FIG. 2A, a method of transforming image text documents and of forming the reflection repository 22 is set forth. In step 100, the image text files are stored in the content repository 12. The image text files may be compiled from various sources external to a specific company through the internet, or the like. Each of the image text files may also have metadata associated therewith.

In step 102, the various batches are managed. Batches define a logical unit of work or set of documents upon which the system services will operate. The system will operate on the set of documents in a batch sequentially. Managing the batches also includes coordinating threads to take advantage of processing schedules using multiple CPUs and manage memory. The system may operate upon multiple batches in parallel. The system also allows administrators to coordinate system execution time frames and batch sizes. Managing batches 102 may also include staging the batches including kicking off the batch of work to the staging phase.

In step 104, the batches may be staged. If the device is on a tape device or in off-line storage, the documents may be pre-fetched. By pre-fetching documents, tape-stored documents or off-line storage avoids a subsequent delay time during the processing. Staging may also determine whether or not the document is within a database table. That is, the documents may be within a database instead of being within a file system. If the files are within a database, segments may be built. The rows of data in the database (BLOBs) may be used to create a file if this document is within a database. The staging phase 104 may also track the results of the staging phase, including the quantity of documents, time to execute, size of documents, and the number of errors.

In step 106, roving of the content repository using the text transformer may be managed. Roving is used to translate an image to text. Various parameters may be set for performing the roving. Managing the roving may coordinate threads to take advantage of processing schedules, use of multiple CPUs, and manage memory. The system may operate upon multiple batches in parallel. The system may allow administrators to define the level of parallel roving to manage. Managing the roving may also include splitting the work up into multiple streams to be operated upon.

In box 108, several steps that illustrate roving are set forth. The roving may take place using the image rover 16. In step 110, the image files are retrieved by the image text transformer 14 from the content repository 12. The metadata may also be retrieved in step 112. In step 114, the recognition of a particular form may be performed. For example, if the document is a particular type of document, this type of form may be recognized in the form-recognition step of 114. In step 116, if the document includes bar codes or supports bar-code recognition, a bar code transformation process may take place. The bar codes may, thus, be interpreted also in step 116. In step 118, an optical character recognition (OCR) process may be performed on the documents. The OCR process may use a number of types of processing.

As mentioned above, the OCR may be performed as a result of another process such as a facsimile recognition process that typically discards OCR results after field indexing is performed.

Step 120 performs editing steps. In step 120, the OCR results may be translated from a first language to a second language. In step 121, lexicons may be formed. The lexicons may be derived from extractions of a customer's structure data or may be a third-party linguistic analytical engine. Common lexicons may also be used as well as standard proper lexicons. Thus, various lexicons may be used to improve the optical character recognition results and/or the translated results. Of course, translation may occur after text resolution. In step 122, the lexicons are used to perform text resolution from the results of the optical character recognition. The text resolution is part of an editing block 126.

In step 123, linguistic analysis from a third-party analytic engine may also be used to help resolve the results of the optical character recognition. Further editing may include a grammar check 124. Various types of grammar checking are known, such as those used in word processors. In step 126, further editing may also take place. The spell check may be similar to that set forth in a word processor. It should be noted that the editing in steps 122-125 may be split apart and processed in parallel batches. An edit manager may be used to schedule and perform the edits illustrated in steps 122-125. After the editing steps in box 126, the text transformer in step 128 may encode the edited image text documents for storage in the reflection repository 22 as reflection documents. In step 130, the reflection documents are stored in the reflection repository. A reflection repository may also store metadata.

The linguistic analysis, grammar check and spell check may be used to change the reflected document or may also be used to change the metadata. That is, if a grammar error in linguistic or spelling check is noted, the reflection document itself may not be modified but the metadata may be modified instead. Another alternative is for the end of the document to be modified with the correct grammar, spelling check, or linguistic change within the document but at the end of the document at the point of the change within the document.

The encoding and storing may be formed so that the reflected documents may easily be searched. The storing, as mentioned above, may also take place in the content repository. The reflected documents may be linked together with the image text document. Linking may be performed so that the same security for the image text document is applied to the reflected document. Each of the documents may have different levels of security, depending on the information contained therein.

Figure 2B:
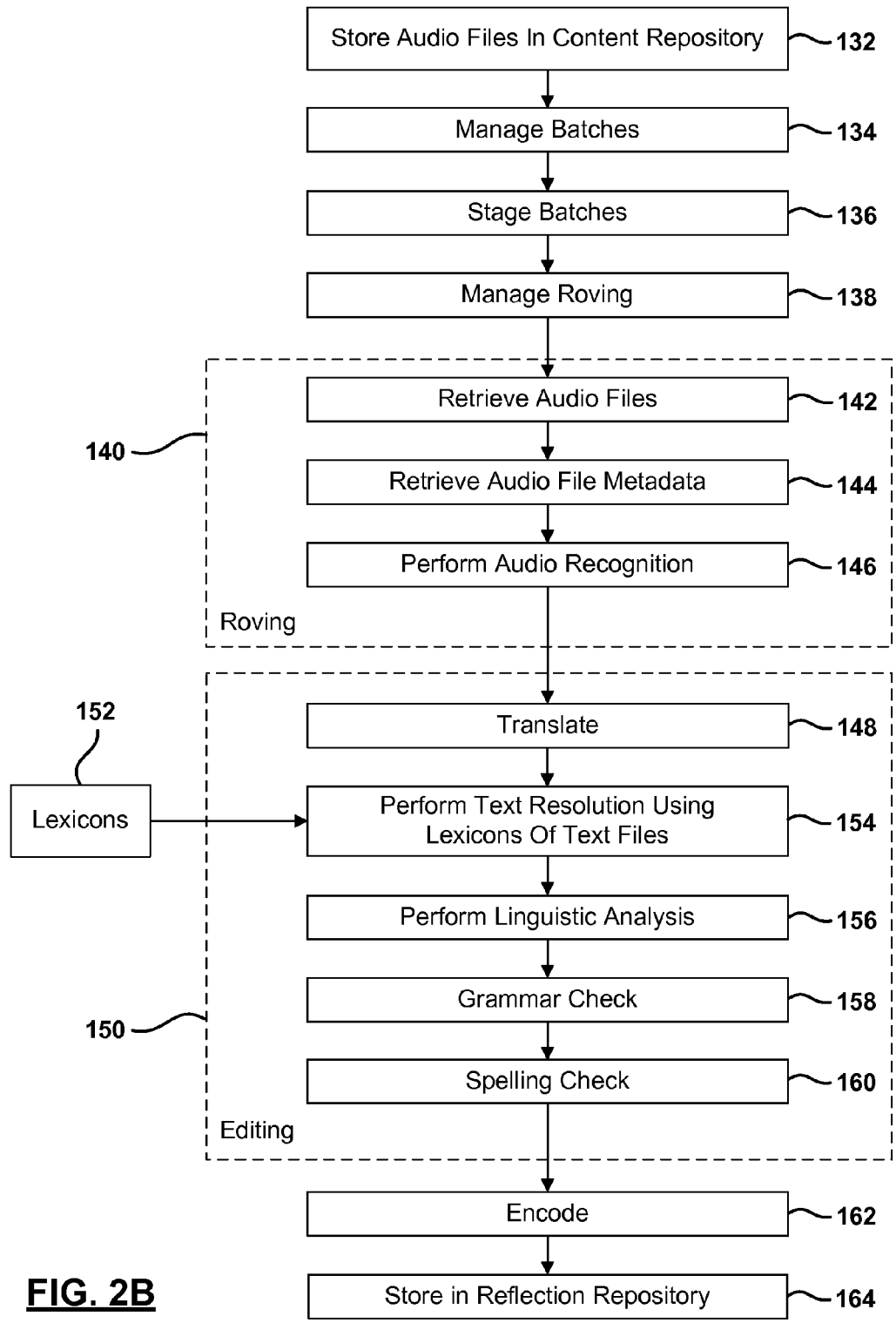
FIG. 2B is a flowchart illustrating a method of converting audio files to text documents.

Referring now to FIG. 2B, a method of forming documents in a reflection repository from audio files is set forth. In step 132, audio files are obtained and stored within the content repository 12. As mentioned above, various sources may provide audio files including from the Internet or various sources within a company such as a voicemail system, dictation systems, or the like. In step 134, the audio files may be processed in batches. Step 134 manages the batches for processing. Managing batches is described above relative to step 102 in FIG. 2A. In step 136, the batches may be staged. Staging the batches is described above relative to step 104 and thus will not be repeated.

In step 138, roving of the content repository using the text transformer may be managed. Roving involves retrieving the audio files and performing audio recognition thereon. The management of roving may include splitting the work into multiple streams to be operated upon by the text transformer.

Box 140 illustrates the steps to be performed in the roving process. Step 142 retrieves the audio file from the content repository. Step 144 retrieves any metadata associated with the audio files. This may include the author or speaker in the audio file, the time of the audio file, and other indications of origin of the audio file. The metadata may also include the subject and key words associated with the audio file. In step 146, audio recognition of the audio file is performed. Audio recognition may, for example, be voice recognition. As is illustrated in FIG. 1, the audio recognition may take place outside of the text transformer inside the text transformer using the audio recognition modules 21, 21'. The result of step 146 is audio text files.

After the initial audio recognition, the audio text files may be edited and translated in step 148. As mentioned above, translation may take place after grammar and spell-checking. A series of steps performed during editing in step 150 is set forth. As described above, lexicons may be formed and used in the processing. Lexicons may be derived from extractions of customer's structured data or may be a third-party linguistic and analytical tool. Within the context of multiple lexicons, the text document may be improved in step 154. In step 156, linguistic analysis may also be performed.

In step 156, linguistic analysis may also be performed on the audio text file to form edited results. For example, a third-party analytical engine may be used as described above in step 132 to form further edited results. Further, steps 158 for grammar-checking and 160 for spell-checking correspond to steps 134 and 136, respectively. As mentioned above, various types of grammar and spell-checking similar to that set forth in a typical word processor may be used.

In steps 162 and 164, the edited results may be encoded and stored in the reflection repository. These steps are similar to the steps set forth above relative to the image text files. Step 162 encodes the edited results for storage within the reflection repository to form the reflection documents. Step 164 stores the reflection documents in the reflection repository. Metadata may also be stored with the reflection documents. The reflection documents correspond to the audio text files.

Figure 3:
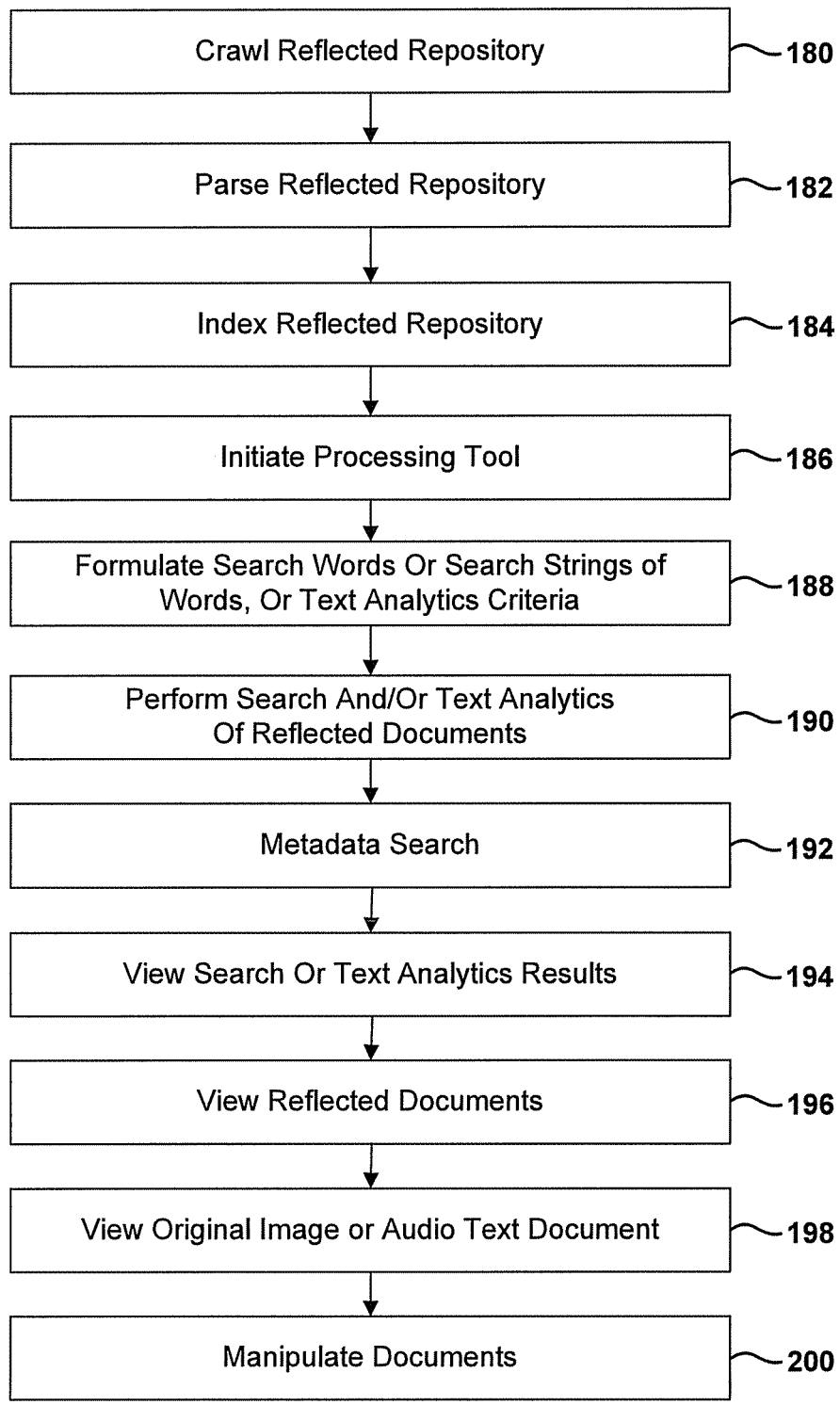
FIG. 3 is a flowchart of a method for searching and displaying according to the present disclosure.

Referring now to FIG. 3, a method for using the reflected documents is set forth. In step 180, a search engine may crawl the reflected repository. That is, the reflection repository documents may be traversed. In step 182, the reflected repository documents may be parsed so that the text of the documents is examined. In step 184, an index of the reflection repository may be created. The index creates a searchable text repository. The steps 180-184 may be performed at various times, including during an initial search, prior to any searching or after new documents are added to the reflection repository.

In step 186, the user initiates the processing tool of FIG. 1. In step 188, the user formulates search words or search strings of interest to the user. Text analysis criteria may also be set by the user. Certain terms or relative placement may be adjusted. In step 190, a search and/or text analytics of the reflected documents is performed. A search or text analytics of the metadata may also be performed simultaneously with a search of the reflected documents in step 192. Searching and text analytics take place using the processing tool 38 illustrated in FIG. 1. In step 194, search and text analytics results may be viewed with the user device. Examples of screen displays of search results are set forth in FIGS. 4 and 5.

Figure 7:
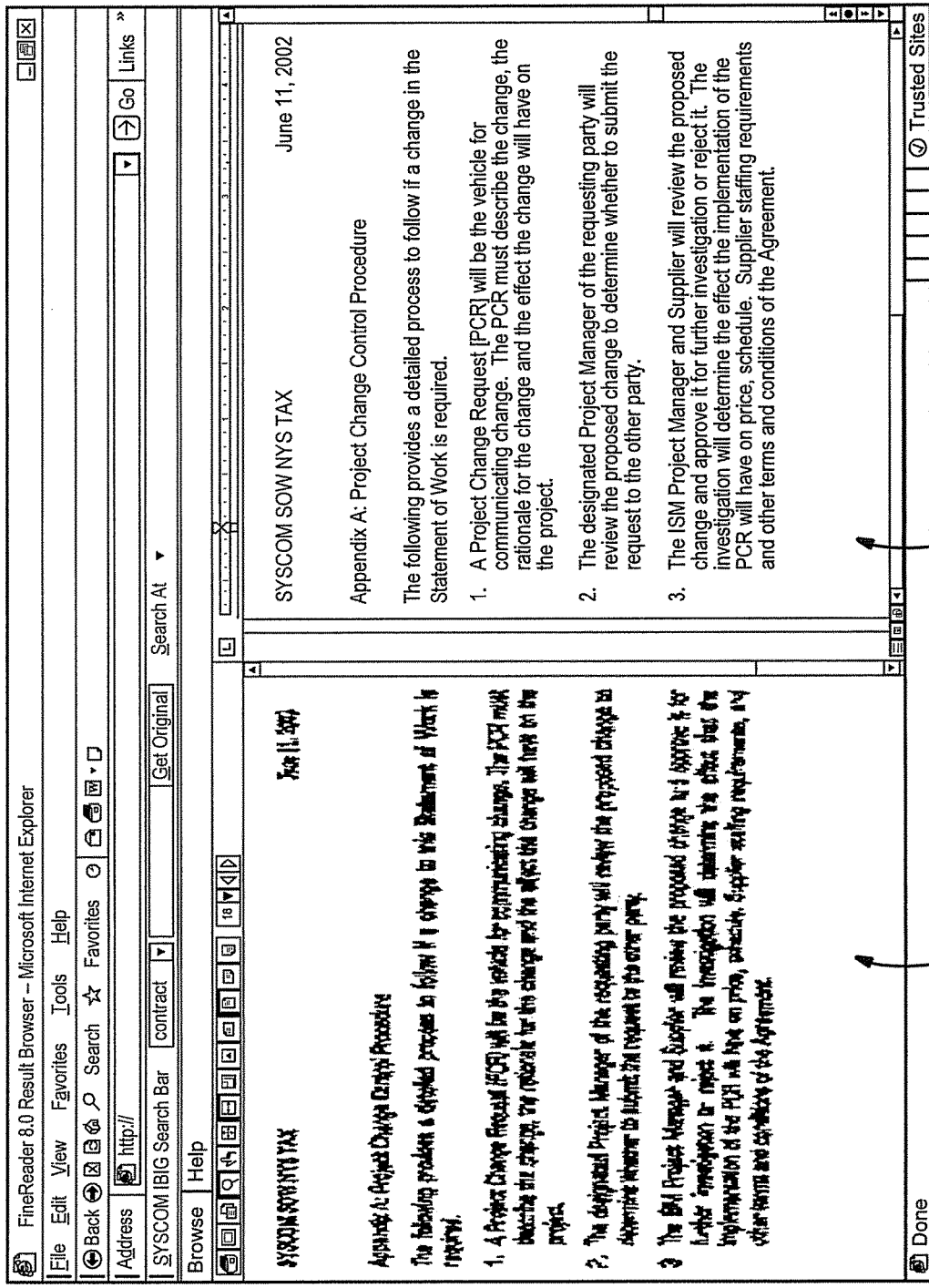
FIG. 7 is a screen display of a results viewer according to the present disclosure.

In step 196, the reflected documents may be viewed. In step 198, the original image text document may also be viewed. It should be noted that the reflected document may be viewed together with the original document as illustrated in FIG. 7. However, either of the reflected document or the original image, audio text file or original audio file may also be viewed or listened to. As mentioned above, in certain situations the reflected documents may be discarded or deleted after the search index is formed. Therefore, only the image, audio text file or original audio file may be viewed or listened to, but the reflected documents used to perform the search index and finding the image or audio text file are not viewed.

In step 200, the documents may be manipulated. That is, various portions of the document may be scrolled, zoomed, panned, rotated, fitted, sized, or negatives made. Also, further manipulations may be performed by annotating, copying, sending, printing, or changing the properties of the document. Spell checking and grammar checking may also be performed after viewing the reflected document. The changes may be performed in the reflected document or in the metadata. Other manipulations include synchronizing the document, highlighting, dual highlighting, scrolling, dual scrolling, viewing edits, and the like. The viewing edits may be performed by looking at both documents and editing the text of the reflected document.

Figure 4:
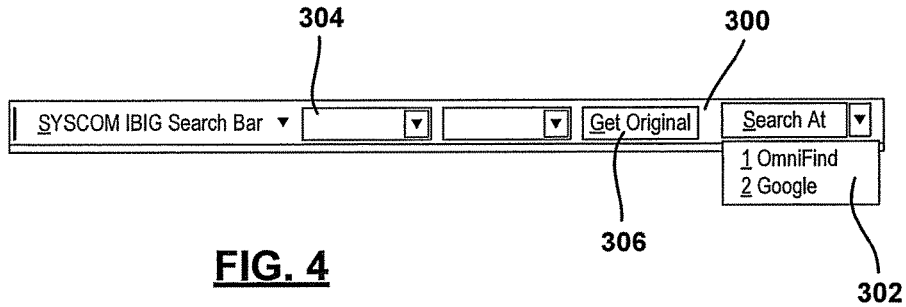
FIG. 4 is a screen display of a search bar according to the present disclosure.

Referring now to FIG. 4, a search bar 300 is illustrated having various search selections 302. In this example, the search engine used may be Omnifind® or Google®. Either of these may be selected for the search engine. In box 304, the user may input various search terms. Box 306 allows the user to get the original document.

Figure 5:
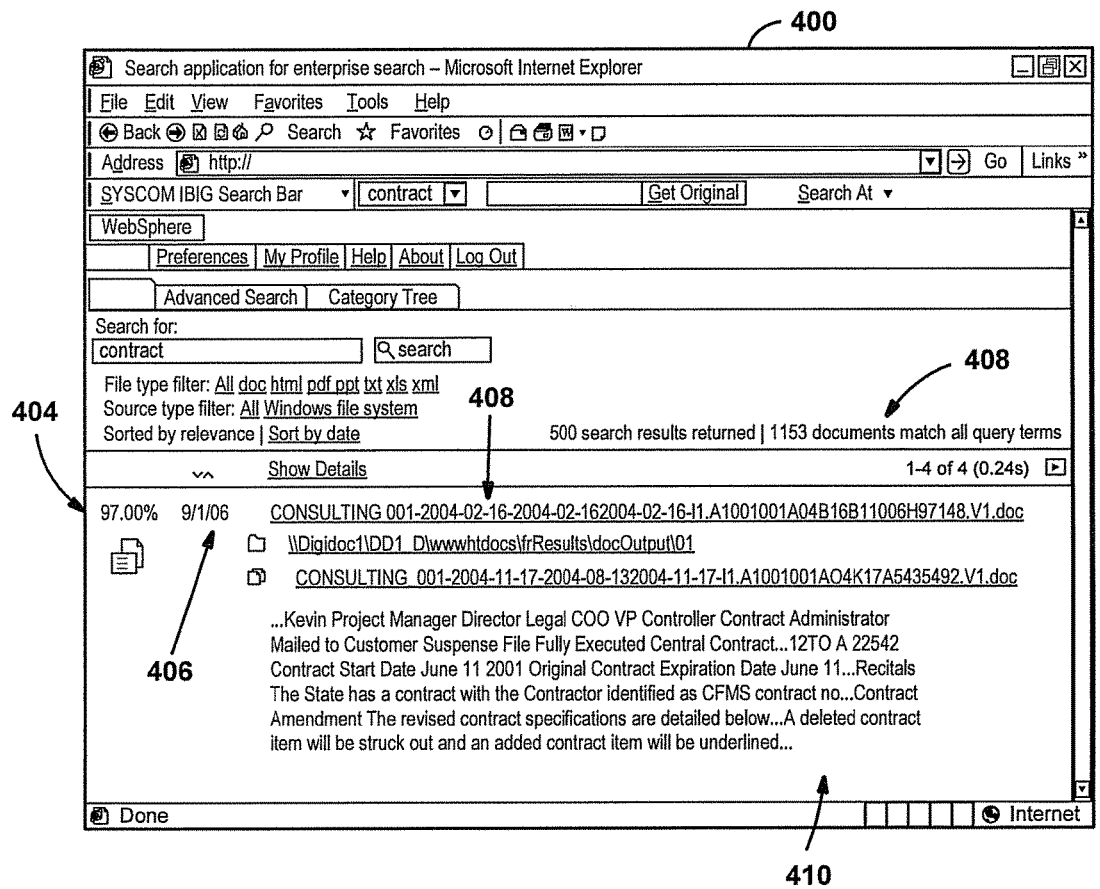
FIG. 5 is a first screen display of a search result using a first search engine according to the present disclosure.

Referring now to FIG. 5, a window 400 in a browser illustrating the search results 402 is illustrated. In this example, the relevancy number is indicated at 404. Also, the date the document was created is illustrated at 406. The document title is illustrated at 408. It should be noted that the document title may be formed from the image text document or may be formed from metadata associated with the image text document or a combination of both. Under the title, portions of the reflected document 410 may be provided with the search term highlighted therein. Each of the results may contain similar formatting with a different relevancy depending on the frequency of the search term selected by the user. The search results are from an Omnifind® search engine.

Figure 6:
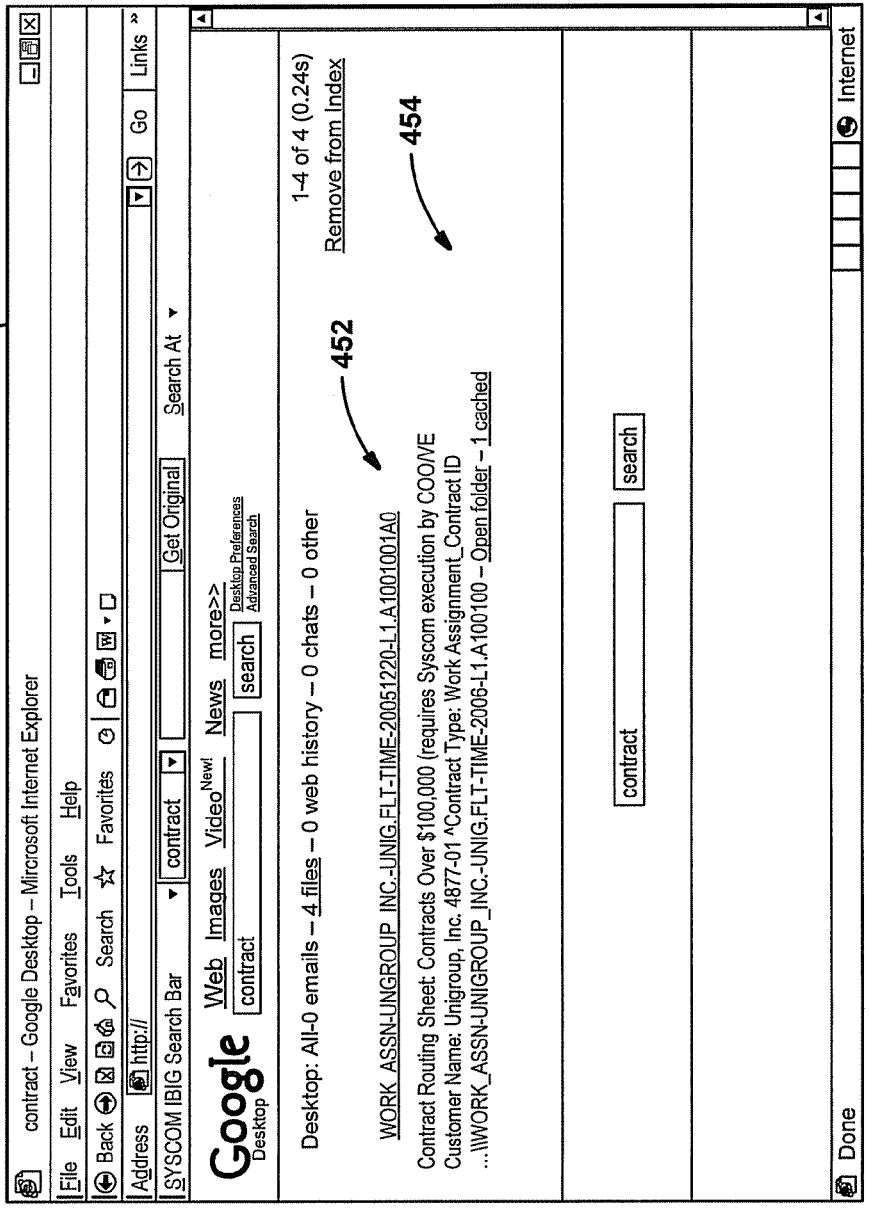
FIG. 6 is a second screen display of a search result using a second search engine according to the present disclosure.

Referring now to FIG. 6, a window 450 illustrating the results of a search using Google® is illustrated. In this example, the titles of the document are illustrated at 452. Also, portions of the document are set forth in 454. The display is set up in terms of relevancy.

Referring now to FIG. 7, a screen display 500 is illustrated having a first image text document 502 from the image text documents displayed side-by-side with a first reflected document 504 from the reflected documents. As can be seen, a direct correspondence is set forth between the terms in the image text document 502 and the reflected document 504. During this time, the user may choose to manipulate, add to, or otherwise change the reflected document or its metadata.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method of processing audio text files generated from audio files comprising:
   receiving audio text files at or from within electronic text transformer;
   translating the audio text files from a first language to a second language;
   after receiving the translated audio text files, in an editing module of the electronic text transformer, linguistically analyzing the audio text files within a context of multiple lexicons to form edited text results, said multiple lexicons comprising more than one of common words, proper names, client specific lexicons, application specific lexicons, industry specific lexicons and third party lexicons;

electronically creating reflection files corresponding to the audio text files from the edited text results;

electronically communicating the reflection files to an electronic reflection repository;

storing the reflection files in the electronic reflection repository;

processing the reflection files by forming a search index from the reflection files and searching, in response to a user request, the search index, or text analyzing the reflection file using the search index;

searching metadata associated with the reflection files or text analyzing metadata associated with the reflection files; and at a display of a user device, displaying a first reflection file from the reflection files or a first audio text file from the audio text files in response to processing and, searching metadata associated with the reflection files or text analyzing the metadata associated with the reflection files.

2. A method as recited in claim 1 further comprising at least one of storing the audio text files in a content repository prior to linguistically analyzing and storing metadata associated with the audio text files in the reflection repository.

3. A method as recited in claim 1 wherein the multiple lexicons include custom lexicons.

4. A method as recited in claim 1 further comprising at least one of grammatically analyzing the edited text results and spell checking the edited text results.

5. A method as recited in claim 1 further comprising displaying at least one of a plurality of search results, a first reflection file from the reflection files and an audio text file in response to searching.

6. A method as recited in claim 1 further comprising displaying a first reflection file from the reflection files and a first audio text file.

7. A method as recited in claim 1 wherein the reflection repository and a content repository storing the audio text files are co-located.

8. A method as recited in claim 1 further comprising linking a first audio text file and a first reflection file from the reflection files in a content repository.

9. A method as recited in claim 1 further comprising linking a first audio text file and a first reflection file from the reflection files in a content repository with a security setting of the first audio text file.

10. A method as recited in claim 1 further comprising at least one of forming a search index from the reflection files and searching the search index, and forming the search index from the reflected files, searching the search index and deleting the audio text files after forming the search index.

11. A method as recited in claim 1 further comprising associating respective metadata with each of the audio text files.

12. A method as recited in claim 11 further comprising at least one of naming each audio text file in response to the respective metadata, and naming each audio text file of the audio text files in response to the respective metadata and wherein searching comprises searching content of each audio text file of the audio text files and the respective metadata.

13. A system for processing audio text files generated from audio files comprising:

an electronic text transformer associated with a processor linguistically analyzing the audio text files within a context of multiple lexicons to form edited text results, said multiple lexicons comprising more than one of common words, proper names, client specific lexicons, application specific lexicons, industry specific lexicons and third party lexicons, said transformer creating electronic reflection files corresponding to the audio text files from the edited text results;

an electronic reflection repository in communication with the text transformer storing the electronic reflection files therein;

a processing tool processing, in response to a user request, the reflection files by forming a search index from the reflection files and searching the search index, or text analyzing the reflection files using the search index and said processing tool searching metadata associated with the reflection files or text analyzing metadata associated with the reflection files; and a user device displaying on a display a first reflection file from the reflection files or a first audio text file from the audio text files in response to processing and, searching, in response to a user request, metadata associated with the reflection files or text analyzing the metadata associated with the reflection files, said user device displaying a search bar for inputting search terms into the processing tool.

14. A system as recited in claim 13 further comprising a content repository storing the audio text files therein.

15. A system as recited in claim 14 wherein the content repository stores reflection files or metadata associated with the audio text files therein, or both comprising at least one of wherein the reflection repository and the content repository are co-located and wherein the text transformer stores the reflection files in the content repository and wherein the content repository stores metadata associated with the audio text files.

16. A system as recited in claim 13 wherein the text transformer grammatically analyzes the audio text files to form the edited text results or spell checks the audio text files to form the edited text results or both.

17. A system as recited in claim 13 wherein the user device displays a plurality of search results in response to searching.

18. A system as recited in claim 17 wherein the user device selects a first search result from the plurality of search results and displays a first reflection file from the reflection files or a first audio text file from the audio text files.

19. A system as recited in claim 17 wherein the user device displays a first reflection file from the reflection files and a first audio file.

20. A system as recited in claim 13 wherein the text transformer links a first audio text file and a first reflection file from the reflection files in a content repository.

21. A system as recited in claim 13 wherein the text transformer links a first audio text file and a first reflection file from the reflection files in a content repository with a security setting of the first audio text file.

22. A system for processing audio text files generated from audio files comprising:

a translation module translating the audio text files and communicating the audio text files to an electronic text transformer;

the electronic text transformer associated with a processor linguistically analyzing the translated audio text files within a context of multiple lexicons to form edited text results, said multiple lexicons comprising more than one of common words, proper names, client specific lexicons, application specific lexicons, industry specific lexicons and third party lexicons, said transformer creating electronic reflection files corresponding to the audio text files from the edited text results;

an electronic reflection repository in communication with the text transformer storing the electronic reflection files therein;

a processing tool processing the reflection files by forming a search index from the reflection files and searching the search index, or text analyzing the reflection files using the search index, and said processing tool searching metadata associated with the reflection files or text analyzing metadata associated with the reflection files; and a user device displaying on a display a first reflection file from the reflection files or a first audio text file from the audio text files in response to processing, and searching, in response to a user request, metadata associated with the reflection files or text analyzing the metadata associated with the reflection files, said user device displaying a search bar for inputting search terms into the processing tool.

* * * * *